United States Patent [19]

Park

[11] Patent Number: 5,401,345
[45] Date of Patent: Mar. 28, 1995

[54] METHOD FOR CONNECTION OF BELL TUBE TO DISTAL END OF INTERNAL FISHLINE TYPE FISHING ROD

[75] Inventor: Bo K. Park, Pusan, Rep. of Korea

[73] Assignee: Silver Star Co., Ltd., Pusan, Rep. of Korea

[21] Appl. No.: 212,238

[22] Filed: Mar. 14, 1994

[30] Foreign Application Priority Data

Apr. 28, 1993 [KR] Rep. of Korea .................. 1993-7423

[51] Int. Cl.[6] .............................................. A01K 87/04
[52] U.S. Cl. .................... 156/172; 156/192; 156/173; 43/24
[58] Field of Search .................. 43/24, 18.5, 18.1; 156/173, 188, 192, 294, 172

[56] References Cited

U.S. PATENT DOCUMENTS

| | | | |
|---|---|---|---|
| 1,595,275 | 8/1926 | White | 43/24 |
| 3,102,358 | 9/1963 | Steinle | 43/24 |
| 5,159,776 | 11/1992 | Horton et al. | 43/24 |
| 5,299,377 | 4/1994 | Akiba | 43/24 |

FOREIGN PATENT DOCUMENTS 1065133 12/1953 France ........................ 43/24

*Primary Examiner*—P. Austin Bradley
*Assistant Examiner*—Jeanne M. Elpel
*Attorney, Agent, or Firm*—Richard T. Holzmann

[57] ABSTRACT

A method for connection of a bell tube to a distal end of an internal fishline type fishing rod. The bell tube and the distal pipe member of the fishing rod are integrated into a single body during production of the distal pipe member, thus to increase the connection force between them. The material for the distal pipe member is wound about a pipe production mandrel such that a distal end of the mandrel remains bare. The bare distal end of the mandrel is inserted into the small diameter section of the bell tube having at least one annular groove thereabout such that ends of both the bell tube and the pipe member come into intimate contact with each other about the mandrel. Connection material, the same material as that of the pipe member, is wound about the bell tube and the pipe member simultaneously such that the connection material fills the annular grooves of the bell tube.

5 Claims, 2 Drawing Sheets

METHOD FOR CONNECTION OF BELL TUBE TO DISTAL END OF INTERNAL FISHLINE TYPE FISHING ROD

FIELD OF THE INVENTION

The present invention relates in general to an internal fishline type fishing rod, and more particularly to a method of connection of a bell tube to the distal end thereof.

BACKGROUND OF THE INVENTION

It has been noted that a conventional external fishline type fishing rod, wherein the fishline is exposed to the outside, exhibits several problems caused by the line being exposed. In order to overcome these problems of the conventional external fishline type fishing rod, there has been proposed an internal fishline type fishing rod which receives the fishline, generally unwound from a spinning reel, and allows the line to pass therethrough thereby exiting the distal end of the fishing rod, protecting the fishline and hiding it from the elements and from view.

However, as the fishline of this internal type rod exits the distal end thereof, it is subjected to a tensional force thereby necessarily coming into frictional contact with the distal end of the rod. Consequently, the fishline as well as the distal end of the fishing rod are eventually damaged by this frictional force.

In an effort to prevent this frictional damage to both the distal end of the rod and the fishline itself, Japanese Patent Laid-Open Publication No. Heisei. 4-117232 discloses a method for production of an internal fishline type fishing rod having a bell shaped tube connected to the distal end of the rod. This bell tube, having an enlarged diameter end which is suitable for reduction of the frictional force generated when the fishline passes the distal end of the fishing rod, is bonded to the distal end with an appropriate adhesive.

The bell tube while reducing the frictional force from damaging both the rod and the line, has, nevertheless, a problem in that it is apt to separate from the distal end when subjected to shock and fresh and salt water common in a fishing environment. Hence, the fishing rod having the bell tube thus bonded thereto is not widely used.

SUMMARY OF THE INVENTION

It is, therefore, an object of the present invention to provide a method for connection of a bell tube to a distal end of an internal fishline type fishing rod in which the aforementioned problem can be overcome and which integrates the bell tube and the distal pipe member into a single body during production of the distal pipe member. This is accomplished by inserting the bare distal end of a pipe production mandrel, having the distal pipe member thereabout, into the bell tube and, thereafter, winding a carbon fiber or a composite material sheet, the same material as that of the distal pipe member, simultaneously on both the bell tube and the distal pipe member.

In order to achieve the above object, a method for connection of a bell tube to a distal end of an internal fishline type fishing rod in accordance with an embodiment of the present invention comprises the steps of: winding the material of a distal pipe member of the fishing rod about a pipe production mandrel such that the distal end of the mandrel remains bare; inserting the bare distal end of the thus wound mandrel into the small diameter section of the bell tube such that ends of both the bell tube and the pipe member come into intimate contact with each other about the mandrel, the smaller diameter section having at least one annular groove thereabout; and winding a connection material, the same material as that of the pipe member, about the connection parts of the bell tube and the pipe member such that the connection material fills the annular groove of the bell tube, thereby integrating the bell tube and the pipe member into a single body.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
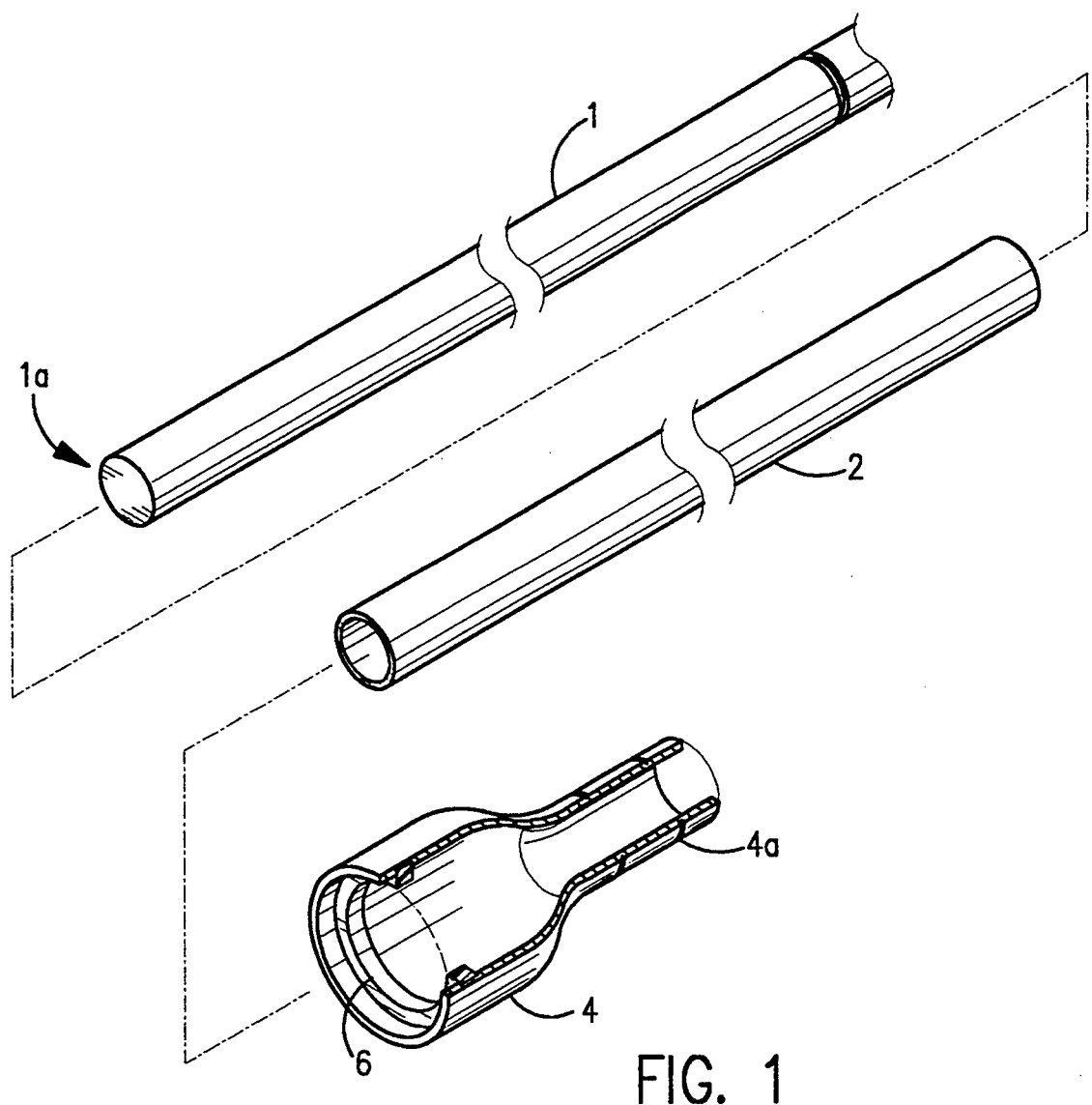
FIG.1 is an exploded perspective view showing a bell tube, a distal pipe and a pipe production mandrel of the present invention.
Figure 2:
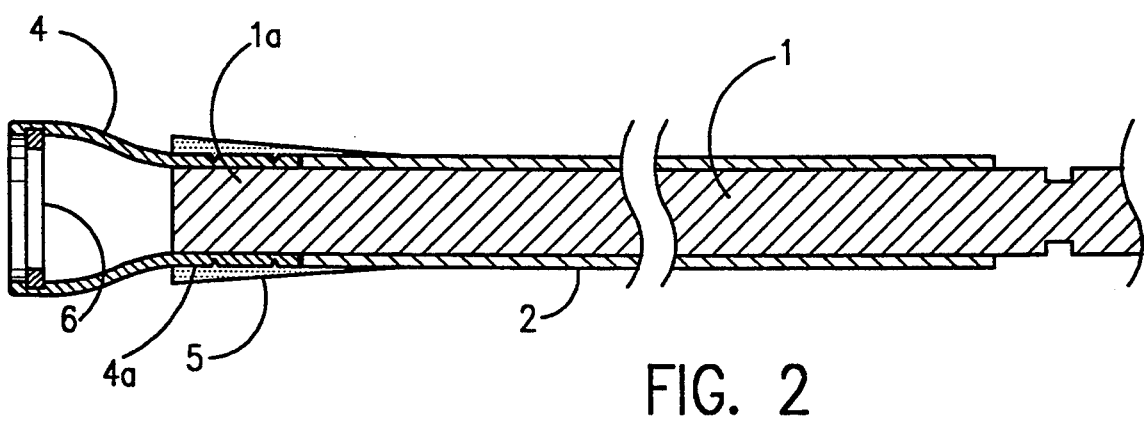
FIG.2 is a longitudinal sectional view showing a sheet wound about both the bell tube and the distal pipe member about the pipe production mandrel in accordance with the present invention.
Figure 3:
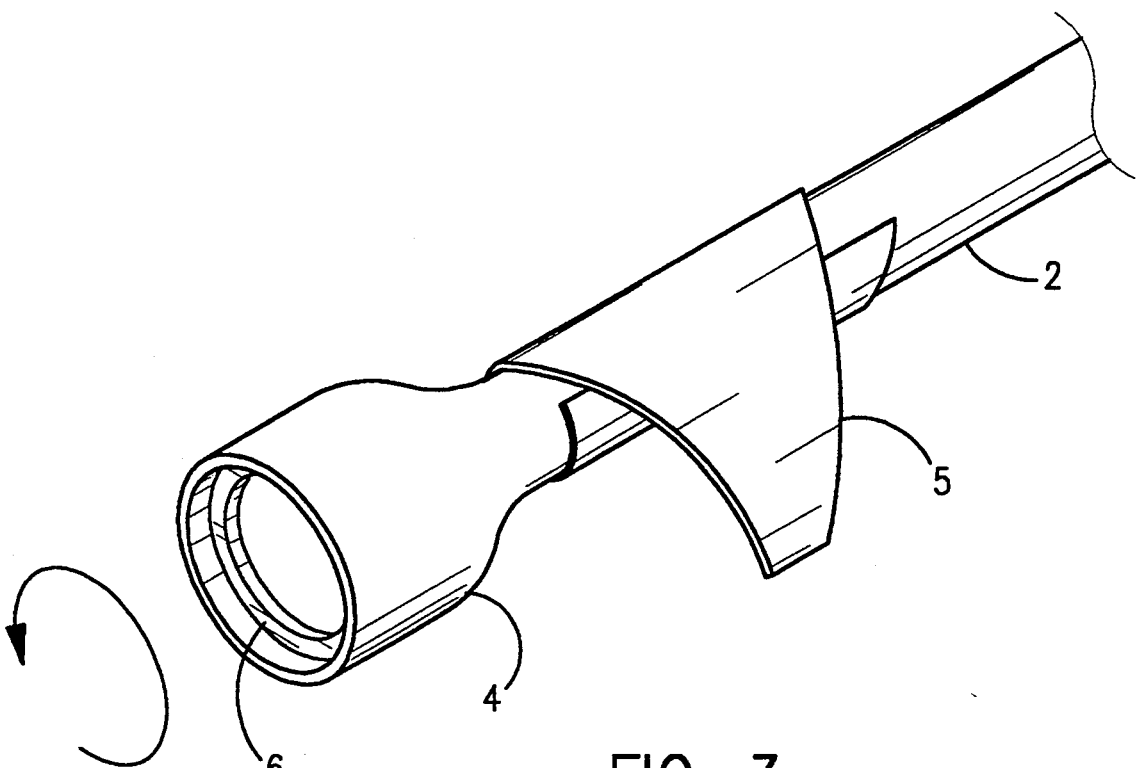
FIG.3 and 4 are a perspective view and a sectional view respectively showing the method for integration of the bell tube and the pipe member into a single body by winding a connection material thereabout in accordance with the present invention.
Figure 4:
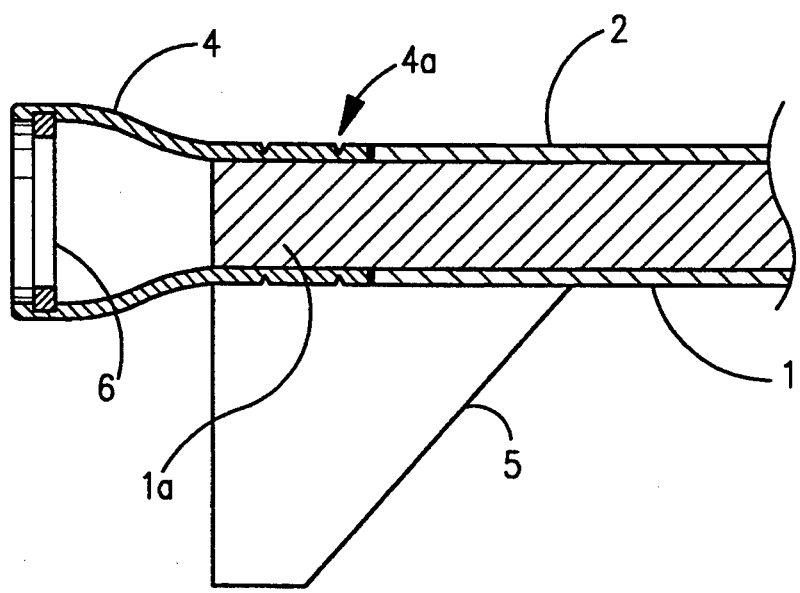

As shown in the drawings, a distal pipe member 2 of an internal fishline type fishing rod is produced by winding a material of pipe member 2 such as carbon fiber or a composite sheet material on a cylindrical pipe production mandrel 1. At this time, the material of pipe member 2 is wound about mandrel 1 such that the distal end 1$a$ of mandrel 1 remains bare in order to separately receive the smaller diameter section of a bell tube 4. After the winding of the material of pipe member 2 on mandrel 1 as described above, the bare distal end 1$a$ of mandrel 1 is inserted into the small diameter section of bell tube 4, previously produced and having annular grooves 4$a$ of a predetermined depth on the outer surface of its small diameter section, such that the end of the small diameter section comes into intimate contact with the distal end of pipe member 2.

Thereafter, a connection material 5, which is of the same material as that of pipe member 2, is wound simultaneously about the connection parts of both bell tube 4 and pipe member 2. As a result of tightly winding connection material 5, material 5 fills the annular grooves 4$a$ of bell tube 4. Subsequent to winding connection material 5, a conventional production process such as resin impregnation is employed in order to continue the production process of the fishing rod. In the resulting pipe member 2 having bell tube 4 at its distal end, the connection force between bell tube 4 and pipe member 2 is greatly increased since the connection material 5 fills the annular grooves 4$a$ of bell tube 4 and is well-integrated with pipe member 2 due to the identity of their materials.

In the drawings, reference numeral 6 denotes a ceramic ring, for reducing the friction of the fishline, received in the larger diameter section of bell tube 4.

The operational effect of the internal fishline type fishing rod of which distal pipe member 2 and bell tube 4 are integrated into one body during production of pipe member 2 is as follows.

As described above, in order to integrate bell tube 4 and distal pipe member 2 into one body, carbon fiber or composite material sheet is wound about pipe production mandrel 1 and, thereafter, the bare distal end of mandrel 1 is inserted into the small diameter end of bell tube 4 having ceramic ring 6 in its large diameter end such that tube 4 comes into intimate contact with the distal end of pipe member 2. Connection material 5 which is the same material as that of pipe member 2 is, thereafter, wound about bell tube 4 and pipe member 2 simultaneously. As a result of winding connection material 5, material 5 fills the annular grooves 4a of bell tube 4, thus to significantly improve the connection force between bell tube 4 and pipe member 2.

Since bell tube 4 and distal pipe member 2 are integrated into a single body as described above, a major advantage of this method is that bell tube 4 does not separate from pipe member 2 even when frequently exposed to the fresh or salt water in the fishing environment. Furthermore, bell tube 4 thereby has the additional strength necessary to resist breaking even after having received repetitive mechanical shocks.

Another advantage of the method of the present invention is that bell tube 4 and distal pipe member 2 can be integrated into a single body during production of pipe member 2. In this regard, the method of this invention especially provides an advantage in that the fishing rod having bell tube 4 is made by mass production techniques.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method for connection of a bell tube to a distal end of an internal fishline type fishing rod comprising the steps of:

winding a material to form a distal pipe member of said fishing rod about a pipe production mandrel such that after formation of said distal pipe member a distal end of said mandrel remains bare;

inserting said bare distal end of said mandrel into the smaller diameter section of said bell tube such that ends of both said bell tube and said pipe member come into intimate contact with each other about said mandrel, the smaller diameter section having at least one annular groove thereabout; and winding a connection material of the same composition as that of said pipe member about connection parts of said bell tube and said pipe member in intimate contact such that said connection material fills the annular groove of said bell tube, thus to integrate said bell tube and said pipe member into a single body.

2. The method of claim 1 wherein said connection material is carbon fiber.

3. The method of claim 1 wherein said connection material is a composite material sheet.

4. The method of claim 1 further comprising a ceramic ring set inside and adapted to the larger diameter end of said bell tube for achieving a desired smooth passing of a fishline through said bell tube and preventing frictional abrasion of the large diameter end of said bell tube and the fishline.

5. The method of claim 1 further comprising a step of impregnating and curing said connection material with resin.

* * * * *